(12) United States Patent
Rahman et al.

(10) Patent No.: US 11,681,358 B1
(45) Date of Patent: Jun. 20, 2023

(54) EYE IMAGE STABILIZED AUGMENTED REALITY DISPLAYS

(71) Applicant: GOOGLE LLC, Mountain View, CA (US)

(72) Inventors: Sazzadur Rahman, San Jose, CA (US); Konstantine Nicholas John Tsotsos, Corte Madera, CA (US); João Manuel de Castro Afonso, Lisbon (PT); José Carlos Maranhão Pascoal, Lisbon (PT); Ivo Duarte, Lisbon (PT); Nuno Cruces, Portela (PT)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/643,711

(22) Filed: Dec. 10, 2021

(51) Int. Cl.
*G06F 3/01* (2006.01)
*G02B 27/00* (2006.01)
*G02B 27/01* (2006.01)
*G06T 19/00* (2011.01)

(52) U.S. Cl.
CPC ......... *G06F 3/012* (2013.01); *G02B 27/0093* (2013.01); *G02B 27/017* (2013.01); *G02B 27/0179* (2013.01); *G06T 19/006* (2013.01); *G02B 2027/0178* (2013.01); *G02B 2027/0187* (2013.01)

(58) Field of Classification Search
CPC ... G06F 3/012; G02B 27/0093; G02B 27/017; G02B 27/0179; G02B 2027/0178; G02B 2027/0187; G06T 19/006
See application file for complete search history.

(56) References Cited

U.S. PATENT DOCUMENTS

| | | | | |
|---|---|---|---|---|
| 10,071,313 B2 * | 9/2018 | Motokura | ............... | A63F 13/56 |
| 10,521,965 B2 * | 12/2019 | Uchida | ...................... | G06T 7/70 |
| 10,937,243 B2 * | 3/2021 | Hamlin | ................ | G06V 10/255 |
| 2010/0141555 A1 * | 6/2010 | Rorberg | ................. | H04N 5/772 |
| | | | | 348/241 |
| 2012/0038669 A1 * | 2/2012 | Lee | ........................ | G06T 19/006 |
| | | | | 345/633 |
| 2015/0062178 A1 * | 3/2015 | Matas | ................... | G06F 3/0346 |
| | | | | 345/648 |
| 2016/0210784 A1 | 7/2016 | Ramsby et al. | | |
| 2016/0260255 A1 * | 9/2016 | Bean | .......................... | G06T 5/10 |
| 2016/0300099 A1 * | 10/2016 | Xiaolu | ...................... | G06T 7/97 |

(Continued)

OTHER PUBLICATIONS

"Measuring Head-Mounted Display's (HMD) Motion-To-Photon (MTP) Latency", OptoFidelity Blog; May 20, 2021, 10 pages.

(Continued)

*Primary Examiner* — Doon Y Chow
(74) *Attorney, Agent, or Firm* — Brake Hughes Bellermann LLP

(57) ABSTRACT

A method includes projecting an augmented reality (AR) user interface (UI) at a first position on a surface of a head-mounted display (HMD) device through which a view of a real-world scene is seen by a viewer, and detecting a motion of the HMD device corresponding to a head motion of the viewer. The method further includes, in response to the motion of the HMD device, moving the projected AR UI across the surface of the HMD device to a second position, the movement of the projected AR UI spatially and or temporally lagging the head motion.

20 Claims, 11 Drawing Sheets

(56) References Cited

U.S. PATENT DOCUMENTS

2017/0212608 A1 7/2017 Burns
2018/0047332 A1* 2/2018 Kuwahara ............ G09G 3/2096

OTHER PUBLICATIONS

Lincoln, "Low Latency Displays for Augmented Reality", (https://sreal.ucf.edu/wp-content/uploads/2018/02/dissertation_lincoln-op.pdf);2017, 101 Pages.
Nguyen, "Low-Latency Mixed Reality Headset", Department of Electrical Engineering and Computer Science; 2019, 10 pages.
International Search Report and Written Opinion for PCT Application No. PCT/US2022/079892, dated Feb. 17, 2023, 13 pages.

* cited by examiner

Displaying an augmented reality (AR) object at a first position and orientation on a surface of a head-mounted display (HMD) device through which a view of a real-world scene is viewed by the viewer. The HMD device is worn on the viewer's head. The first position and orientation on the surface correspond to a first position of the HMD device (e.g., before the viewer's head motion).
510

Detecting a movement of the HMD device to a second position corresponding to a movement of the viewer's head
520

In response to the detected movement, moving the displayed AR object to an intermediate position and orientation on the surface of the HMD device, the intermediate position and orientation lying between the first position and orientation and a head-locked position and orientation on the surface of the HMD device, the head-locked position and orientation corresponding to the second position of the HMD device
530

Projecting an augmented reality (AR) object (e.g., a two-dimensional (2D) AR user interface (UI)) at a first position on a surface of a head-mounted display (HMD) device through which a view of a real-world scene is seen by a viewer
610

Detecting a motion of the HMD device corresponding to a head motion of the viewer
620

In response to to the motion of the HMD device, moving the projected AR object across the surface of the HMD device to a second position, the movement of the projected AR object spatially and or temporally lagging the motion of the HMD device corresponding to the head motion of the viewer
630

EYE IMAGE STABILIZED AUGMENTED REALITY DISPLAYS

FIELD OF THE DISCLOSURE

The present disclosure relates to augmented reality displays and more specifically to augmented reality displays that respond to a viewer's head motions.

BACKGROUND

An augmented reality (AR) display (in a head-mounted optical transparent display) may include a transparent AR object or content (e.g., an AR user interface (UI) or other object) overlaid on a person's view of a real-world scene. In a world-locked mode, the overlaid AR content may appear fixed in the real-world as the viewer's head moves. Conversely, in a head-locked mode, the overlaid AR content moves along with the viewer's head movements while staying in the person's field of view (FOV). Physiological human eye image stabilization reflexes (e.g., Vestibulo-Ocular Reflex (VOR), and Optokinetic Reflex (OKR), etc.) may be triggered when a person attempts to view the AR display while moving. The stabilization reflexes may cause the person's eyes to move relatively smoothly (except for possibly some tolerable eye saccades) when viewing world-locked AR content. However, when viewing head-locked AR content, the stabilization reflexes may cause the person's eyes to jerk relative to the AR display (e.g., to change focus back and forth between the displayed AR content and the real-world) while the person's head is moving. The latter can be an unpleasant or uncomfortable experience.

SUMMARY

In a general aspect, a method includes displaying an augmented reality (AR) object at a first position and orientation on a surface of a head-mounted display (HMD) device through which a view of a real-world scene is viewed by a viewer. The HMD device is worn on the viewer's head, and the first position and orientation on the surface correspond to a first position of the HMD device. The method further includes detecting a movement of the HMD device to a second position corresponding to a movement of the viewer's head, and in response to the detected movement, moving the displayed AR object to an intermediate position and orientation on the surface of the HMD device. The intermediate position and orientation are between the first position and orientation and a head-locked position and orientation on the surface of the HMD device, where the head-locked position and orientation correspond to the second position of the HMD device.

In a general aspect, a method includes projecting an augmented reality (AR) object at a first position on a surface of a head-mounted display (HMD) device through which a view of a real-world scene is viewed by a viewer, and detecting a motion of the HMD device corresponding to a head motion of the viewer. The method further included in response to the motion of the HMD device, moving the projected AR object across the surface of the HMD device to a second position. The movement of the projected AR object spatially and or temporally lags the motion of the HMD device corresponding to the head motion of the viewer.

In a general aspect, a system includes a computing device configured to project an augmented reality (AR) object at a first position and orientation on a surface of a head-mounted display (HMD) device worn on a viewer's head, and at least one sensor configured to detect a motion of the HMD device corresponding to a head motion of the viewer. The computing device is further configured to, in response to the motion of the HMD device, move the projected AR object across the surface of the HMD device to a second position. The movement of the projected AR object spatially and or temporally lags the motion of the HMD device.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

FIG. 5 illustrates an example method for display of AR content on a HMD device.

FIG. 6 illustrates another example method for display of AR content on a HMD device.

Figure 1A:
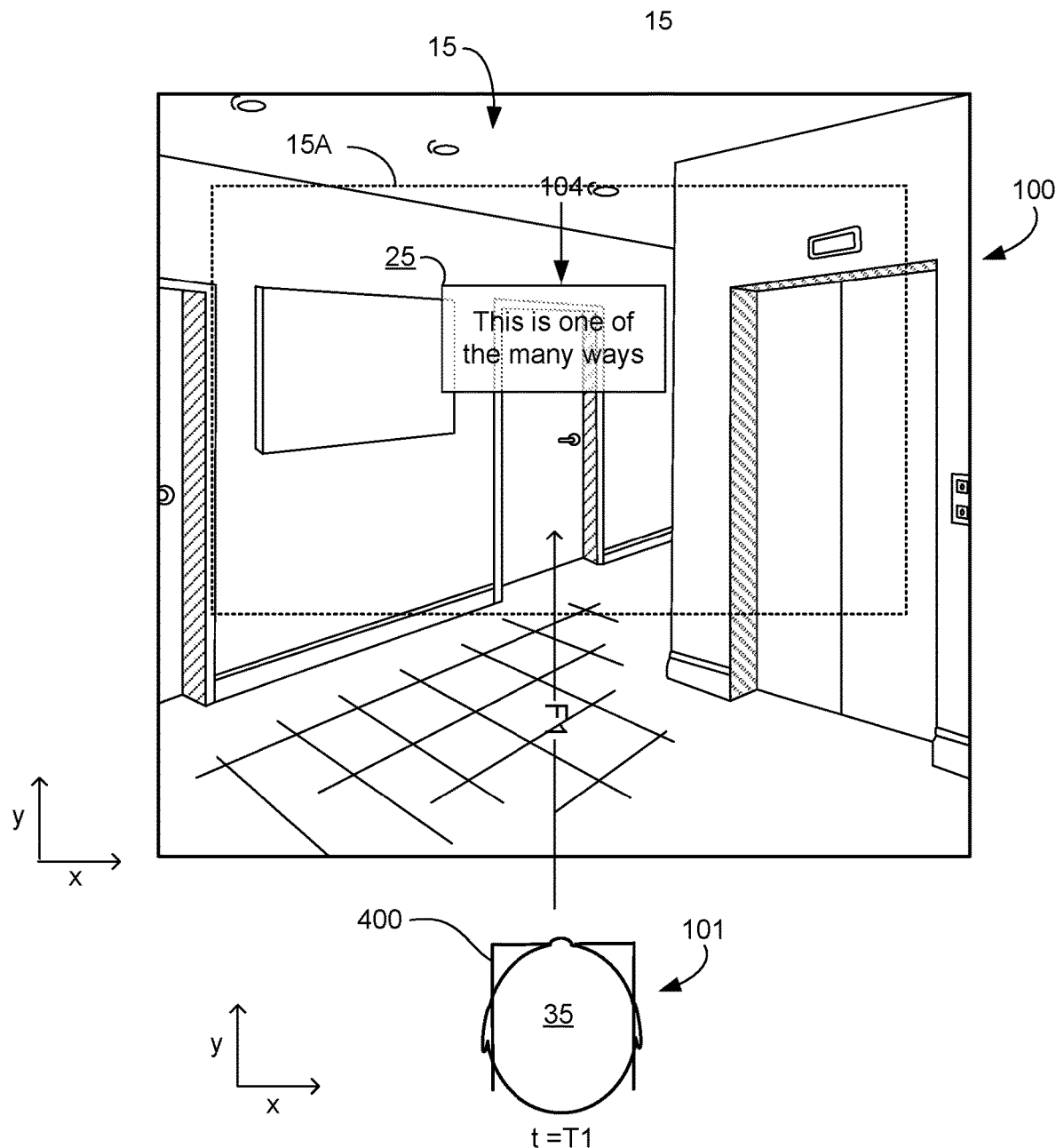
FIG. 1A, FIG. 1B, FIG. 1C, and FIG. 1D (which may be viewed in conjunction) illustrate aspects of world-locked mode, head locked mode, and stabilized mode behaviors of augmented reality (AR) content in AR displays.

It should be noted that the drawings are intended to illustrate the general characteristics of methods, structure, or materials utilized in certain example implementations and to supplement the written description provided below. The drawings, however, need not be to scale and may not precisely reflect the precise structural or performance characteristics of any given implementation, and should not be interpreted as defining or limiting the range of values or properties encompassed by example implementations. The use of similar or identical reference numbers in the various drawings is intended to indicate the presence of a similar or identical element or feature in the various drawings.

DETAILED DESCRIPTION

Systems and methods for displaying augmented reality content (e.g., a two-dimensional (2D) AR object or content) are described herein. An image of the 2D AR object or content may, for example, be rendered or projected onto a surface (e.g. a lens surface) of a head-mounted display (HMD) device (e.g., an optical head mounted display device (OHMD)) through which a view of a real-world scene is being seen by a viewer. The projected AR object or content may overlay the view of the real-world scene seen thorough the surface of the HMD device by the viewer. The view of a real-world scene and the overlaid AR object (e.g., which can be at least partially transparent) or content (AR content) seen through the HMD device may be individually or collectively referred to herein as the AR display.

An AR object or content can include any combination of one or more of graphics, text, and images, which can be fixed or animated (e.g., animation, video). Information related to the AR object or content may be stored in a memory as a three dimensional (3D) asset. A 3D asset may be in a file format (e.g., .OBJ format) that includes information describing the AR object or content in three dimensions. Three-dimensional (3D) assets can be rendered into a two-dimensional (2D) image (e.g., a two-dimensional (2D) AR object or content) based on a determined viewpoint.

The HMD device is worn on, or is physically attached to, the viewer' head. Therefore, movement of the HMD device can be synonymous with movement of the viewer's head. When the viewer's head is stationary, the 2D AR content in the AR display may be in a fixed or stationary position relative to the viewer's head and the real-world scene. This fixed or stationary position (corresponding to when the viewer's head is stationary) may be equivalently considered to correspond to either a world-locked mode position or a head-locked mode position.

In the world-locked mode, the position and orientation of the overlaid 2D AR content in the AR display does not depend on the viewer's head motion (in other words, the 2D AR content stays fixed on a feature of the real-world scene independent of the amplitudes or frequencies of the HMD device/viewer's head movement). In a head-locked mode, the position and orientation of the overlaid AR content in the AR display depends only on the position and orientation of the viewer's head (as if the AR object or content were rigidly attached by a rigid rod to the viewer's head) independent of any features of the real-world scene. The overlaid AR content may move across the real-world scene in the AR display instantly in response to viewer's head movements for all types (e.g., all amplitudes, frequencies, and directions, 6 degree of freedom (6 DoF) movements) of the viewer's head motions. For example, a circular or sinusoidal frequency head motion will cause the overlaid AR content to move across the real-world scene at the same circular or sinusoidal frequency as the head motion. Further, for example, a tilt or roll head motion will cause the overlaid AR content to tilt away from a gravity vertical at the same angle as the head motion tilt or roll away from the gravity vertical.

The foregoing examples of rendering the movement of the overlaid AR content across the real-world scene in the AR display instantly or directly in response to viewer's head movements (as if the AR object or content were rigidly attached by a rigid rod to the viewer's head) describe instances where there is no specific compensation or corrections to the movement of the overlaid AR content across the real-world scene. In other words, no compensation or corrections for the amplitudes, frequencies, and directions, or 6 degree of freedom (6 DoF) movements of the viewer's head.

The disclosed systems and methods implement an additional mode (i.e., an eye image stabilization mode) of the AR display in the OHMD device. In the eye image stabilization mode, the movement behavior of the overlaid AR content in response viewer's head motions can be intermediate to the responsive movement behaviors of the overlaid AR content in the world-locked mode and the head-locked mode. In other words, the eye image stabilization mode can be a hybrid of the world-locked mode and the head-locked mode.

In the eye image stabilization mode (also can be referred to as a stabilized mode), the movement of the overlaid AR content across the real-world scene in the AR display may not be instantaneous in response to a head motion. In the stabilized mode, the movement of the overlaid AR content may lag the viewer's head motion. Further, in the stabilized mode, the movement of the overlaid AR content may have amplitudes and frequencies (or directions) that are a complex function (e.g., a non-linear function) of the amplitude, frequency or other characteristics of the head motion. The movement of the overlaid AR content may also be constrained or limited to keep the overlaid AR content within the boundaries or edges of the AR display or a portion of the AR display, biased to move the overlaid AR content toward a center of the AR display, and or biased to align the overlaid AR content with gravity.

The disclosed systems and methods are intended to displace or move the AR content (e.g., an AR user interface (UI)) in response to the viewer's head motions to new positions and orientations overlaying the real-world scene with a goal of stabilizing eye images of the AR display throughout the viewer's head motions. The movement of the AR content to the new positions and orientations may be weakly coupled to the viewer's head motions and may be in linear or non-linear proportion to quantitative parameters or characteristics of the viewer's head motions. The movement and the new positions and orientations of the AR content may be configured to stabilize or to at least encourage stabilization of eye images of the AR display while the viewer's head is moving. The AR displays that stabilize or tend to stabilize of the eye images of the AR displays while the viewer's head is moving may be referred to herein as stabilized displays (even though elements of the display, e.g., the 2AR content, can be still moving and need not be completely stationary while the viewer's head is moving).

In example implementations, the systems and methods may involve tracking the viewer's head motions and filtering motion tracking signals as corresponding to, for example, large amplitude head motions or small amplitude head motions. For a small amplitude head motion, the systems and methods may further involve presenting or displaying the AR content as if it were in a world-locked content mode (i.e., either fixed or almost fixed to a feature in the real-world scene). For a large amplitude head motion, the systems and method may involve presenting or displaying the AR content as gradually (i.e., non-abruptly) moving toward a head-locked content mode position (e.g., from an initial world-locked mode position or orientation). The rate at which the AR content gradually transitions to the head-locked content mode position may be based on measured parameters characterizing the viewer's head motions and on consideration of the goal of producing a stabilized display.

The movement paths of the overlaid AR content may have a different shape than the shape of the paths of the head motion. This difference in the shape of the movement path of the overlaid AR content (e.g., path P2, FIG. 1D) and the shape of the path of the head motion (e.g., path P1, FIG. 1C) can be referred to herein as a spatial lag of the movement path of the overlaid AR content relative to the shape of the path of the head motion.

The parameters characterizing the viewer's head motions may include for example, one or more of three dimensional (3D) translational coordinate positions (i.e., x, y, z) and/or three degrees of freedom (3 DoF) rotational orientation parameters (i.e., yaw, pitch, roll) of the viewer's head. These parameters can collectively define six degrees of freedom (6 DoF) movements. The parameters may be measured or determined, for example, by one or more sensors (e.g., inertial measurement units (IMUs), capacitive sensors, accelerometers, gyroscopes, etc.) that may be included in or attached to the HMD device is worn on the viewer' head.

FIG. 1A, FIG. 1B, FIG. 1C, and FIG. 1D (which may be viewed in conjunction) illustrate aspects of the world-locked mode, head locked mode, and stabilized mode behaviors of the overlaid 2D AR content in AR displays that can be presented on HMD devices.

FIGS. 1A-1D illustrate an AR display 100 that can be viewed on an HMD device from different viewpoints or perspectives by a viewer. Each of the perspectives or viewpoints may be determined or characterized by respective three dimensional (3D) translational coordinate positions (i.e., x, y, z) and/or three degrees of freedom (3 DoF) rotational orientation parameters (i.e., yaw, pitch, roll) of the viewer's head. The combination of the coordinate positions and the orientation parameters can be referred to as a position or pose of the viewer's head. For convenience in description, the term position (or pose) of the viewer's head as used herein will be understood to refer to the 3 DoF orientation parameters (i.e., yaw, pitch, roll) and or the combination of the coordinate positions and 3 DoF orientation parameters.

FIG. 1A is schematic illustration of an example AR display 100 seen by a viewer 35 wearing a head-mounted display (HMD) device (e.g., smart glasses 400, FIG. 4), in accordance with the principles of the present disclosure. The viewer may see a real-world scene 15 through a lens surface of the HMD device, and AR display 100 may, for example, show a 2D view of real-world scene 15 in a x-y plane.

In the scenario shown in FIG. 1A, at time t=T1, viewer 35 may be at a position 101. Viewer 35 may be viewing AR display 100 including real-world scene 15 through a lens or lenses (e.g., lenses 404 and 405, FIG. 4) of example smart glasses (e.g., smart glasses 400). At position 101, viewer 35 may be facing AR display 100 in a forward direction F1 at time t=T1. The viewer at position 101 may be seeing a portion (e.g., portion 15A) of real-world scene 15 in his or her field of view (FoV) through the lens surface of the HMD device.

AR display 100 may include a 2D AR content 25 (e.g., a 2D AR object or content including, for example, the typed text: This is one of the many ways) projected on, or overlaid on, the real-world scene 15 seen through smart glasses 400. As shown in FIG. 1A, at time t=T1, 2D AR content 25 may be at a position 104 in forward direction F1 on the real-world scene 15. The viewer at position 101 may see 2D AR content 25 at a position 104 overlaying portion 15A of real-world scene 15 in his or her field of view (FoV) through the lens surface of the HMD device.

Figure 1B:
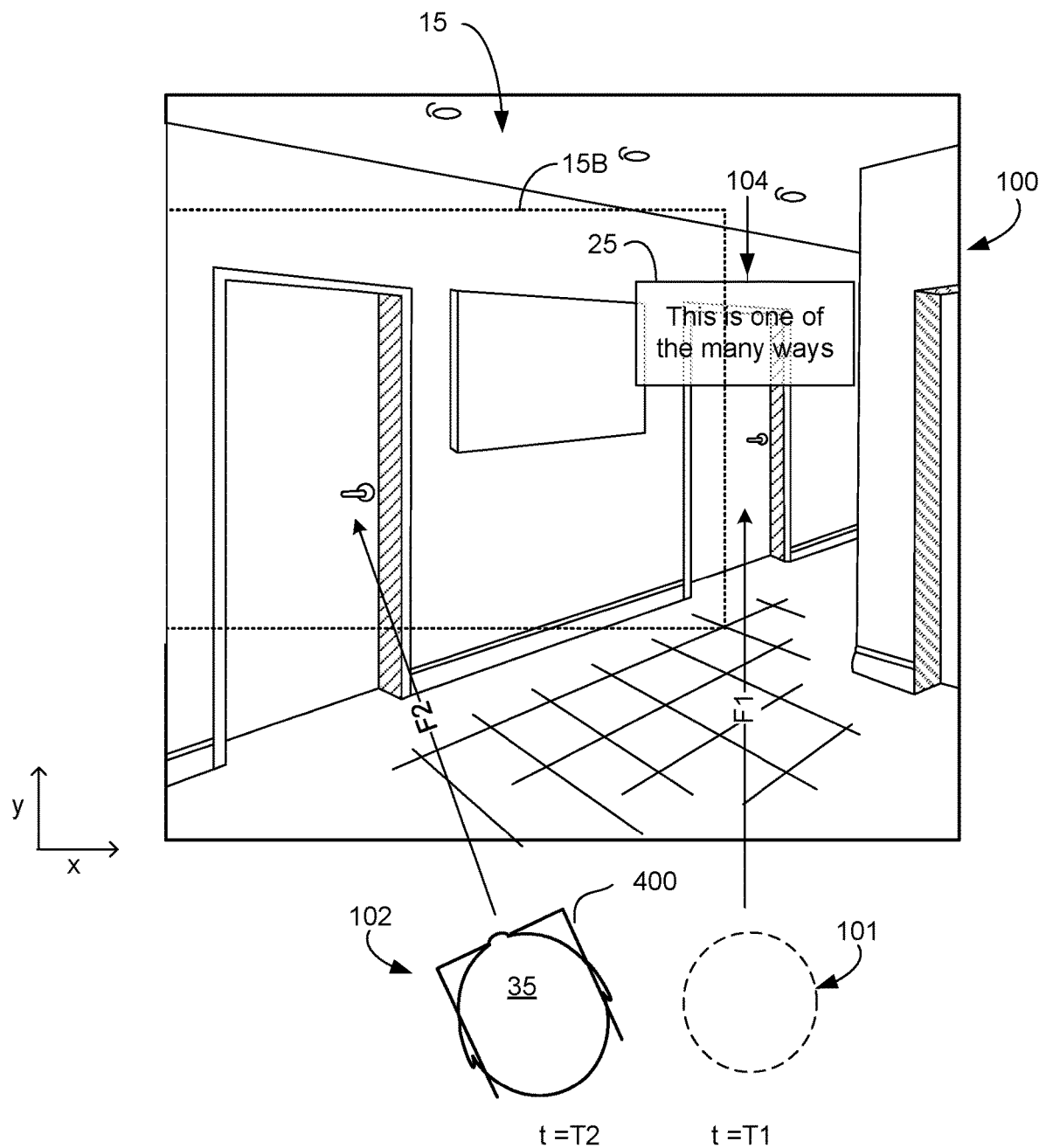

FIG. 1B illustrates the behavior of 2D AR content 25 in AR display 100 in response to the viewer's head motions when the AR display is, for example, in a world-locked mode. In the scenario shown in FIG. 1B, at time t=T2, viewer 35 may be at a position 102 having moved from position 101 (FIG. 1A) over the time interval T2–T1. The viewer's head motions from position 101 to position 102 may include any combination of translational and/or angular movements of the head. The angular movements may, for example, include rotational motions such as roll, yaw, or pitch of the viewer's head.

At position 102 at time t=T2, instead of facing AR display 100 in forward direction F1 as at time t=T1, viewer 35 may be facing AR display 100 in a forward direction F2 (in other words, at time t=T2 the viewer may be looking at another area of the real-world scene 15 than he or she was looking at from position 101, FIG. 1A). The viewer at position 102 may be seeing another portion (e.g., portion 15B) of real-world scene 15 in his or her field of view (FoV) through the lens surface of the HMD device (in other words, the viewer may be looking at another portion of the real-world scene 15 than he or she was looking at from position 101).

However, as shown in FIG. 1B, in the world-locked mode, 2D AR content 25 does not move (from position 104, FIG. 1A) in response to the viewer's head motions (from position 101 to position 102) but remains stationary or fixed on the real-world scene at position 104.

Figure 1C:
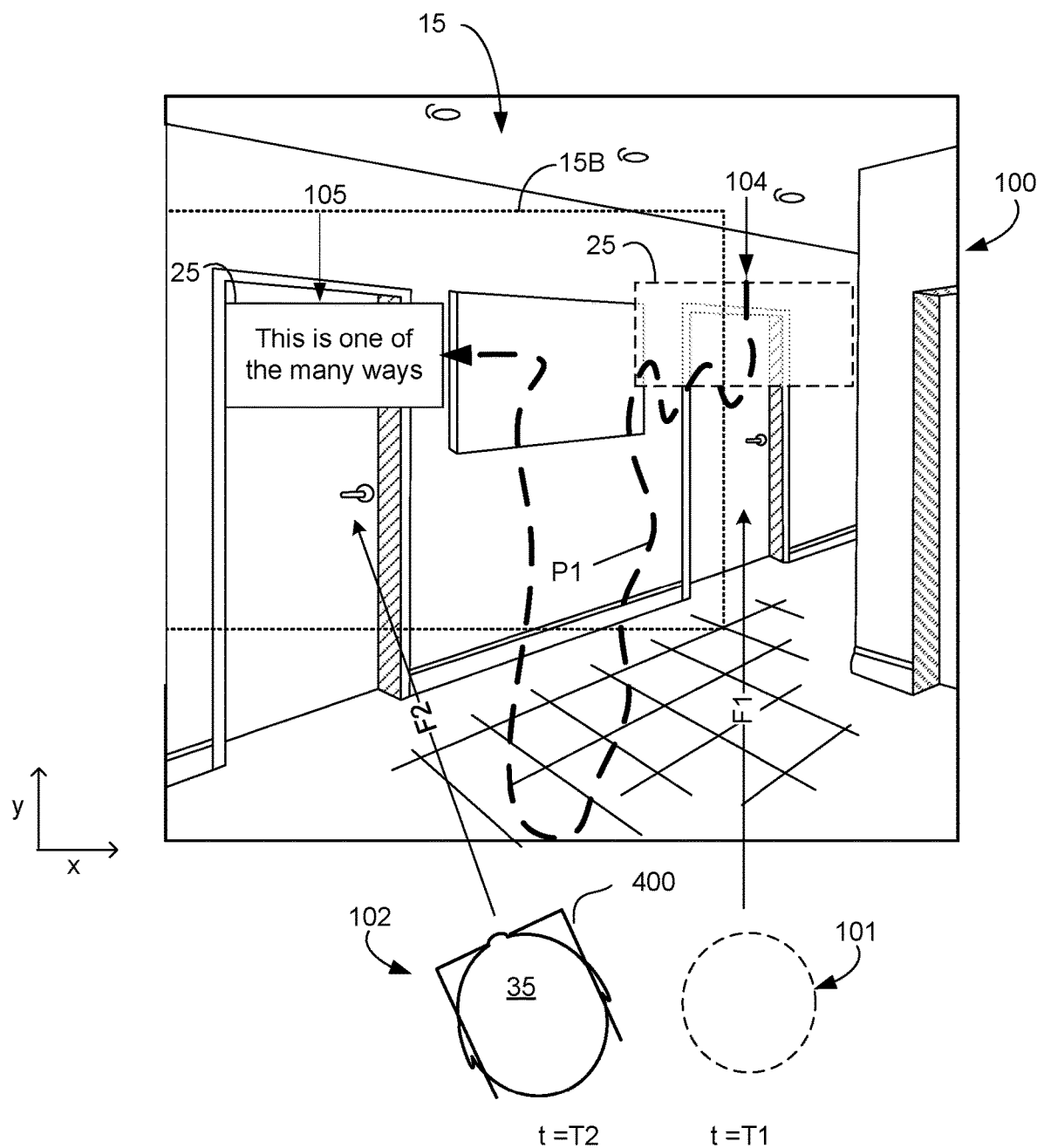

FIG. 1C illustrates the behavior of 2D AR content 25 at position 104 in response to the viewer's head motions when the AR display 100 is in, for example, a head-locked mode. In the head-locked mode, the position (and orientation) of 2D AR content 25 is rigidly coupled to the position (and orientation) of the viewer's head. In the scenario shown in FIG. 1C (as also shown in FIG. 1B), at time t=T2, viewer 35 may be at a position 102 having moved from position 101 (FIG. 1A) over the time interval T2–T1. The viewer's head motions from position 101 to position 102 may include any combination of translation and/or angular (i.e., rotational) movements. At position 102, (as also shown in FIG. 1B) viewer 35 may be facing AR display 100 in a forward direction F2 at time t=T2 instead of facing AR display 100 in forward direction F1 as at time t=T1. As in the world-locked mode (FIG. 1B), in the head-locked mode. the viewer at position 102 may be seeing another portion (e.g., portion 15B) of real-world scene 15 in his or her field of view (FoV) through the lens surface of the HMD device.

Unlike the world-locked mode (FIG. 1B), in the head-locked mode as shown in FIG. 1C, 2D AR content 25 does not remain stationary or fixed on the real-world scene at position 104. Instead, 2D AR content 25 compensates for the viewer's head motions (from position 101 to position 102) and moves from position 104 to a new position (i.e., position 105) on AR display 100.

In the head-locked mode, the movement of 2D AR content 25 from position 104 (at time t=T1) to position 105 (at time t=T2), for example, along a path P1 across the real-world scene, may closely track the viewer's head motions from position 101 (at time t=T1) to position 102 (at time t=T2) in real time. Every direction, amplitude and frequency in the viewer's head motion may have a corresponding direction, amplitude, and frequency in the movement of 2D AR content 25 transiting from position 104 (at time t=T1) to position 105 (at time t=T2). In some instances, large amplitude head movements (e.g., the viewer looking up to the ceiling and down to the floor) may cause the 2D AR content 25 to be displaced or pushed up against or outside the boundaries or edges of AR display 100. In some instances, small amplitude high frequency head movements (e.g., the viewer vigorously shaking his or her head) may cause a corresponding high frequency jitter in 2D AR content 25 projected on AR display 100. In some instances, the 2D AR content 25 may rotate (e.g., along with a viewer's head roll) so that textual content (e.g., This way is only one of the many ways) is no longer aligned with gravity and becomes difficult to read. FIG. 1C shows an example path P1 that may be traversed by 2D AR content 25 in transiting from position 104 to position 105 in a fully head-locked mode.

In the head-locked mode, the responsiveness of the position or orientation of 2D AR content 25 to every move (e.g., every sudden twist, turn, or jerk) of the viewer's head can create an unstable eye image of AR display 100 in the viewer's eyes as 2D AR content 25 moves from position 104 (at time t=T1) to position 105 (at time t=T2) along path P1 across the real-world scene.

Figure 1D:
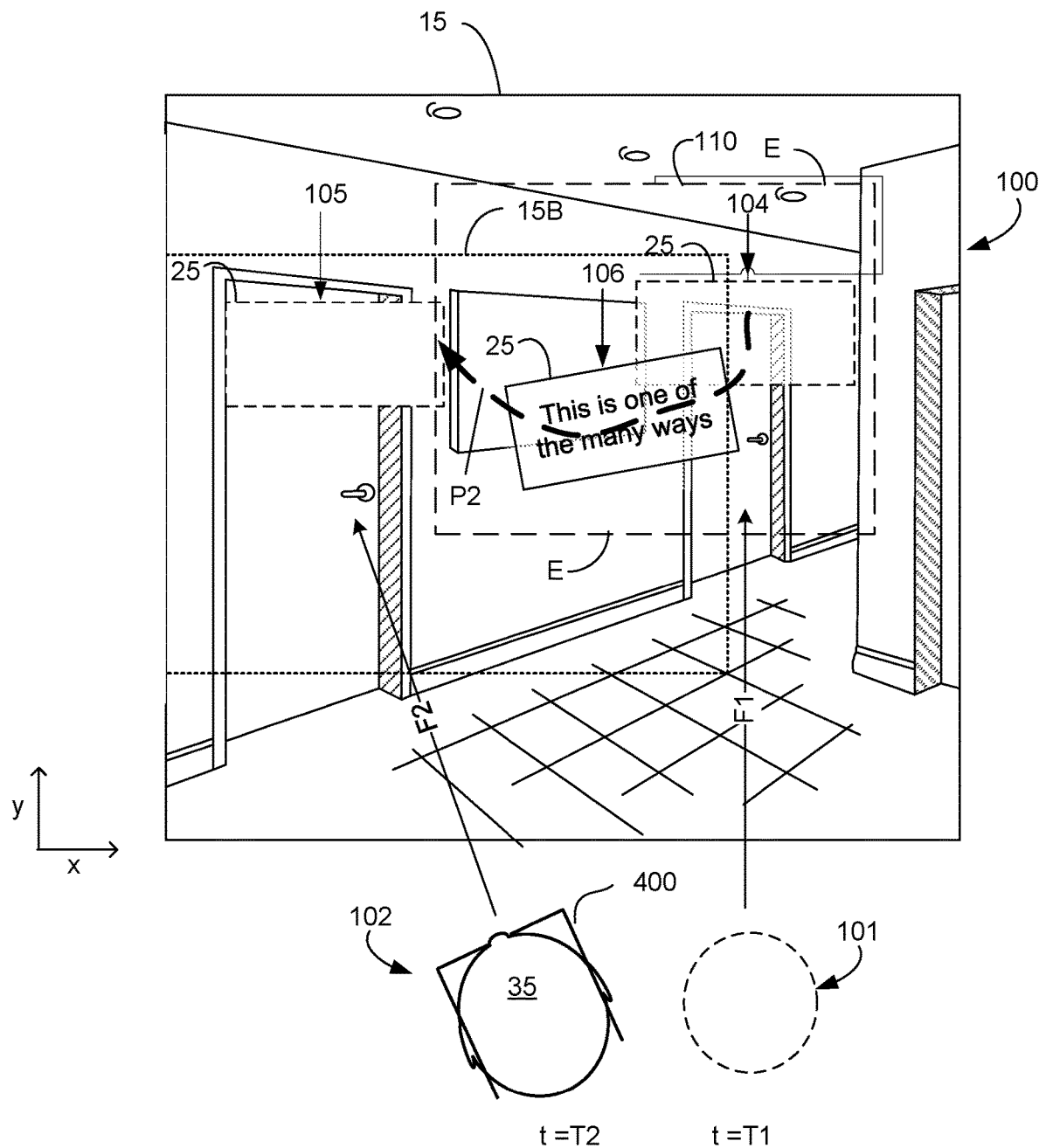

FIG. 1D illustrates the behavior of 2D AR content 25 when the AR display 100 is in, for example, an eye image stabilization mode (stabilized mode). FIG. 1D shows, for example, 2D AR content 25 in transit between position 104 and position 105 in response to (i.e., compensating for) the viewer's head motions when the AR display 100 is in the eye image stabilization mode (stabilized mode).

In the stabilized mode, the rigid attachment of 2D AR content 25 to the viewer's head in the head-locked mode may be relaxed or attenuated. Movements of 2D AR content 25 in AR display 100 responsive to the viewer's head movements may lag (i.e., may be delayed or be spatially different than) the viewer's head movements to present, for example, a stable or a more stable image of the AR display 100 including 2D AR content 25 in the viewer's eyes. For example, as shown in FIG. 1D, at time t=T2 when the viewer is at position 102 (e.g., viewing portion 15B of real-world scene 15 in his or her FoV), 2D AR content 25 may still be at a position 106 in transit (e.g., along a path P2) between starting position 104 and the final head-locked position 105 (described above with reference to FIG. 1C).

In the stabilized mode, the response of 2D AR content 25 (i.e., responsive movements of the 2D AR content) to viewer's head motions may be dampened. For example, the responsive movements of 2D AR content 25 may be constrained to be responsive to viewer's head motions within a limited allowed range (e.g., limited in direction, amplitude and/or frequency) of movements. For example, as shown in FIG. 1D, 2D AR content 25 may be constrained to remain within a range 110 (e.g., a rectangular area) on AR display 100 when transiting between starting position 104 and the final head-locked position 105. The limits of the allowed range 110 of the movements of 2D AR content 25 along path P2 may be a function of one or more characteristics (e.g., direction, amplitude, and or frequency) of the viewer's head motions. In example implementations, the position of 2D AR content 25 may not respond (i.e., remain substantially stationary) to high frequencies of head motion, or may respond only to an averaged frequency of head motion (in other words, high frequency head motions may be filtered out and not responded to with 2D AR content 25 movements). Avoiding the high frequency responses may avoid presenting blurry images of 2D AR content 25 to the viewer.

In example implementations, keeping 2D AR content 25 within range 110 may avoid situations in which an unconstrained 2D AR content 25 could, for example, move outside the edges of the AR display 100 (e.g., to become out of view of the viewer, or otherwise tax the viewer's OVR responses). In example implementations, the responsive movements of 2D AR content 25 may be biased to move 2D AR content 25 toward a center C of range 110 (or a center of AR display 100) when transiting between starting position 104 and the final head-locked position 105. Movements of 2D AR content 25 may be constrained or restricted not to exceed range 110. For example, when a moving 2D AR content 25 approaches the boundaries (i.e. edges, E) of range 110, the position of 2D AR content 25 may be reset or returned to, or pulled back toward, the center of range 110 (i.e., center C), for example, by a spring-like bouncing action off the range boundaries or edges.

Figure 2A:
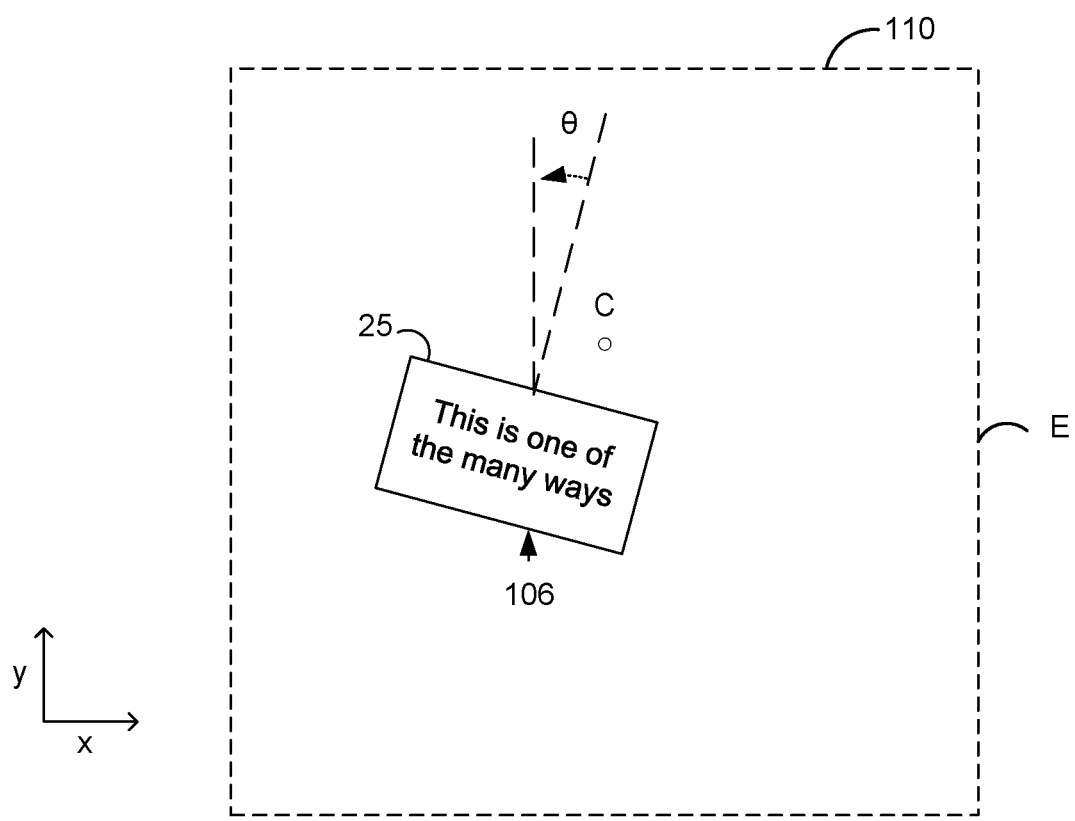
FIG. 2A illustrates an example rendering of an AR display.

In example implementations, a rendering of a moving 2D AR content 25 in AR display 100 may be constrained to remain aligned with gravity so that textual content in 2D AR content 25 remains vertical and can be comfortably read. FIG. 2A illustrates an example rendering of 2D AR content 25 in a portion (i.e., range 110) of AR display 100.

Figure 2B:
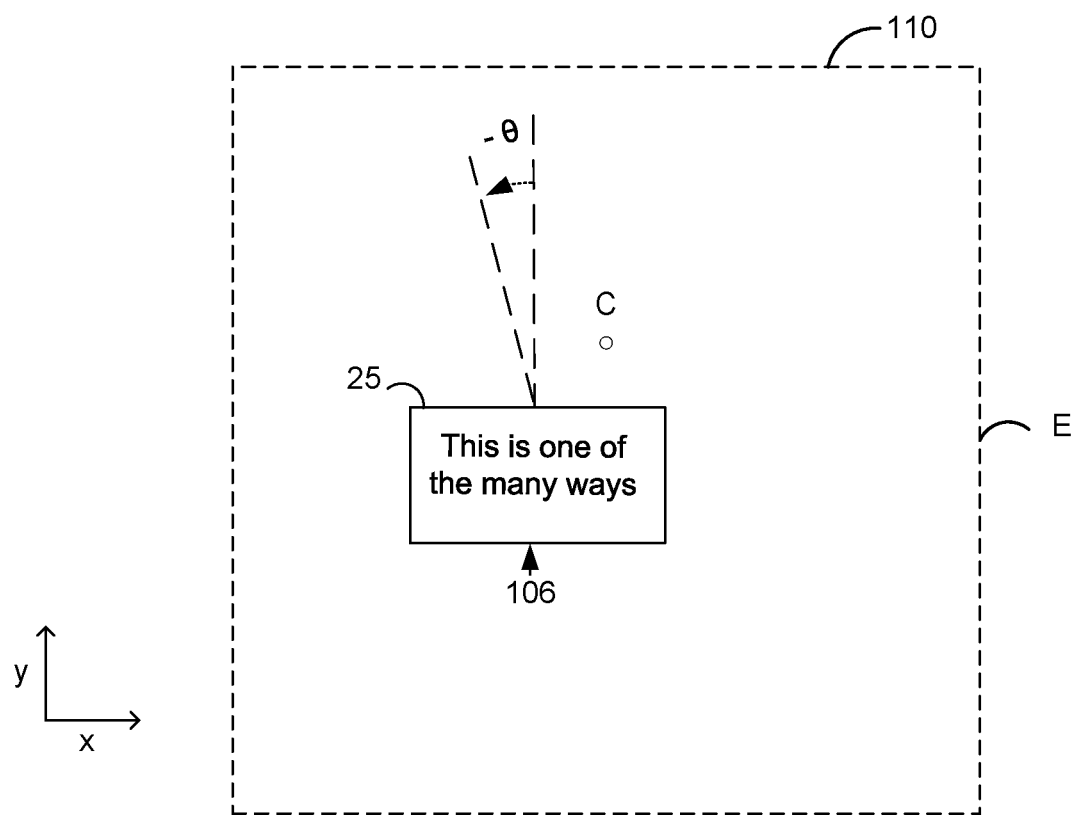
FIG. 2B illustrates an example rendering of the AR display of FIG. 2A after a negative roll angle rotation is applied to rotate an AR object.

In the example shown in FIG. 2A, 2D AR content 25 is not aligned with gravity (i.e., is not aligned with the vertical y axis). 2D AR content 25 may be tilted counter-clockwise away from the vertical y axis by a roll angle θ, for example, in response to a roll motion of the viewer's head. The tilted textual content (i.e., This way is only one of the many ways) in the misaligned 2D AR content 25 may be difficult or uncomfortable to read. Such misalignment may be corrected by applying a negative roll angle (angle-0) to rotate 2D AR content 25 back clockwise in the opposite direction to the roll head movement (angle θ). FIG. 2B shows an example rendering of 2D AR content 25 after the negative roll angle rotation (angle−θ) is applied to rotate 2D AR content 25 to make the textual content vertical or more vertical.

In example implementations, an example HMD device may include a switch (e.g., a hardware switch or a software switch) which may allow a person (e.g., a viewer or an administrator) to switch or toggle the HMD device (and AR display 100) between any of the world-locked mode, the head-locked mode, and/or the stabilized mode. Such switching can be configured through a user preference, for example, for the world-locked mode or the stabilized mode.

Figure 3:
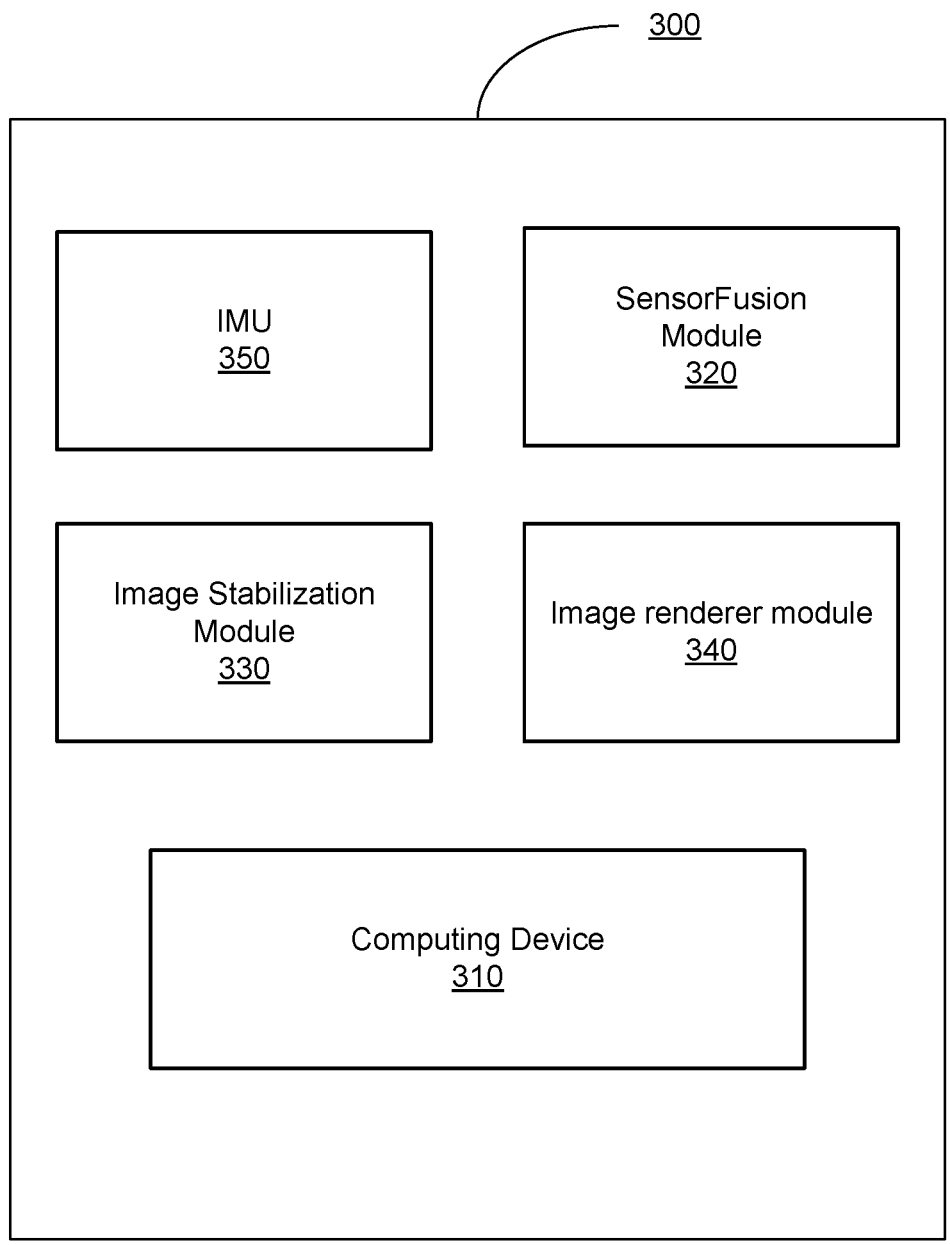
FIG. 3 illustrates an example system for rendering AR content onto a surface of a head-mounted display (HMD) device.

FIG. 3 illustrates an example system 300 for rendering augmented reality content (e.g., a two-dimensional (2D) AR object or content) onto a surface (e.g. a lens surface) of a head-mounted display (HMD) device (e.g., smart glasses 400, FIG. 4) through which a view of a real-world scene is being seen by a viewer. System 300 may be configured to render stabilized image displays of the AR object or content on the real-world scene while the viewer's head is moving.

In example implementations, system 300 may include, or be coupled to, one or more inertial measurement units (IMUs) (e.g., IMU 350) that are attached to, or included in, the HMD device worn by the viewer. Further, system 300 may, for example, include a sensor fusion module 320, an image stabilization module 330, and an image renderer module 340. The components of system 300 may be coupled to, or hosted on, a computing device (e.g., computing device 310). Computing device 310 may be included in, or be communicatively linked to, the HMD device (e.g., smart glasses 400, FIG. 4).

IMU 350 may include an accelerometer configured to measure acceleration of the viewer's head along each of the three linear axes (x, y, and z), and a gyroscope to measure angular velocity about three axes: pitch (x axis), roll (y axis) and yaw (z axis). IMU 350 may be configured to periodically measure and stream the acceleration and angular velocity measurement data (frames) to sensor fusion module 320. IMU 350 may stream the acceleration and angular velocity measurement data at an IMU frame rate of, for example, about 100 cycles per second (cps)).

Sensor fusion module 320 may include algorithms to combine the acceleration and angular velocity measurement data received from IMU 350 to determine the orientation (i.e., pose) of the viewer's head in 3D space at the time stamp of the IMU data. In example implementations, sensor fusion module 320 may include algorithms to estimate IMU biases (e.g., gyroscope and accelerometer biases) and determine a 3 DoF pose of the viewer's head. In example implementations, angular velocity may be integrated into a delta rotation (e.g., the angle between an initial position and a current position) assuming a constant frame rate and speed.

Sensor fusion module 320 may provide the determined 3 DoF poses (e.g., at the IMU rate) to image stabilization module 330.

Image stabilization module 330 may be configured to, given a pose when the AR object or content will be shown on the real-world scene in the HMD device, compute the roll, pitch and yaw corrections required for modifying (warping) the image of the AR object or content (based on the pose of the viewer) for a stabilized display on the HMD device. In example implementations, image stabilization module 330 may apply x and y translational corrections and angular roll corrections to the positions of the rendered image of the 2D AR object or content on the HMD device (to stabilize the rendered image of the AR object or content on the HMD device).

In example implementations, image stabilization module 330 may use one or more pre-defined control parameters or settings to control or limit the range of movements or shifting of the AR object or content on the HMD device (in response to changes in the pose of the viewer) for a stabilized moving display.

The one or more pre-defined control parameters may, for example, include three parameters that may be respectively used to control or limit yaw, pitch, and roll compensation ranges. In example implementations, the yaw or pitch compensation range may be measured in pixels, while the roll compensation range may be measured in degrees.

Further, the one or more pre-defined control parameters may, for example, include a dampening setting, a stiffness setting, and a center bias setting. Each of these settings may have a pre-defined value, for example, between 0% and 100%.

In example implementations, the dampening setting (with a value between 0% and 100%, e.g., 50%) may be used to scale down an angular speed used to compensate for pitch (x axis) or yaw (y axis) head motions.

In example implementations, the stiffness setting (with a value between 0% and 100%) may be used to control behavior at the limits (e.g., edges) of the pitch/yaw range. A 100% stiffness setting value may mean a hard bump or return of the moving 2D AR object or content off the edges, a 0% stiffness setting value may mean the pitch/yaw range may be ignored, and an in-between stiffness setting % values may result in a proportionally softer bump or return of the moving 2D AR object or content off the edges.

Further, in example implementations, the center bias setting (with a value between 0% and 100%, e.g., 70%) may be used to pull the moving AR object or content back to the center of screen. A non-zero center bias setting may ensure that "at rest" content is centered on screen.

In example implementations, image stabilization module 330 may include example algorithms that use angular velocity data (i.e., direct gyroscope reading with bias compensation) to compensate for yaw and or pitch motions, and use the 3 DoF pose data to compensate for roll (head tilt) (e.g., to keep the image of the 2D AR object or content aligned with gravity). The example algorithms may further integrate angular velocity into a delta rotation and use the delta rotation to perturb (i.e., rotate) a forward vector (e.g., a gaze vector).

The perturbed forward vector may then be projected from 3D to 2D, and a negated forward vector may be used to shift (i.e., move) the image of the 2D AR object or content.

As an example, using quaternions to represent spatial orientations and rotations of elements in three dimensional space, the angular velocity w measured by the IMU may be integrated into a delta rotation $\Delta q$ assuming constant frame rate and speed over a time interval $\Delta t$ using the approximate formula:

$$\Delta q = [1, \omega \Delta t/2]$$

Both 3 DoF pose and delta rotation $\Delta q$ may transformed from IMU space to a delta rotation $\Delta q'$, for example, in an eye space associated with the HMD device. The delta rotation $\Delta q'$ can be used to rotate a forward vector $v_0$ forward in time t into a rotated vector $v_{t+1}$, where:

$$v_0 = [0, 0, -1], \text{ and}$$

$$v_{t+1} = \text{rotate}(\Delta q', v_t)$$

The rotated forward vector can be then projected using a projection matrix of the HMD device to get vectors v', and $-v'_x$ and $-v'_y$ that are then applied to shift or move the 2D AR object or content to a new position.

In example implementations, the forward vectors and the rotation may be represented in quaternion mathematical notation as follows:

$v_o$ initial forward vector at $t=0$, $[0,0,-1]$, $v_1$ rotated forward vector at $t=1$; and $\Delta q$ integrated rotation in last frame.

After projection to 2D, $v_0$ initial gaze vector at $t=0$, $[0,0]$, and $v1$ rotated forward vector at $t=1$ Thus in 2D, the initial forward vector $v_o$ after projection to 2D becomes a point, which would mean no compensation.

The negated x, y components of the forward vector at t=1 may be used to shift (i.e. move) the image of the 2D AR object or content at t=1 in the opposite direction to yaw and pitch head movements.

In example implementations for tilt or roll compensation, the 3 DoF pose of the viewer may be decomposed into Euler angles (e.g., in yaw-pitch-roll order). To avoid gyroscopic gimbal lock, roll compensation may be reduced when pitch approaches ±90° (i.e., when the viewer is looking up or down). A negative roll correction may be applied to the image of the 2D AR object or content (e.g., to align the overlaid 2D AR object or content with gravity).

In an example implementation, to avoid gimbal lock at extreme pitch (i.e., when the viewer is looking up or down), the roll (i.e., angle $\theta_{roll}$) may be reduced to an angle $\theta'$ as given by the equation:

$\theta' = \theta_{roll}/(1 + \tan^2(\theta_{pitch}))$, where $\theta_{pitch}$ is the pitch angle.

The negative roll (i.e., $-\theta'$) may be used to rotate the 2D AR object or content in the opposite direction to the roll head movement to ensure, for example, that 2D AR object or content stays gravity aligned.

Next, image renderer module may render the modified (warped) image of the 2D AR object or content as a stabilized image display of the 2D AR object or content on the view of the real-world scene in the HMD device while the viewer's head is moving.

Figure 4:
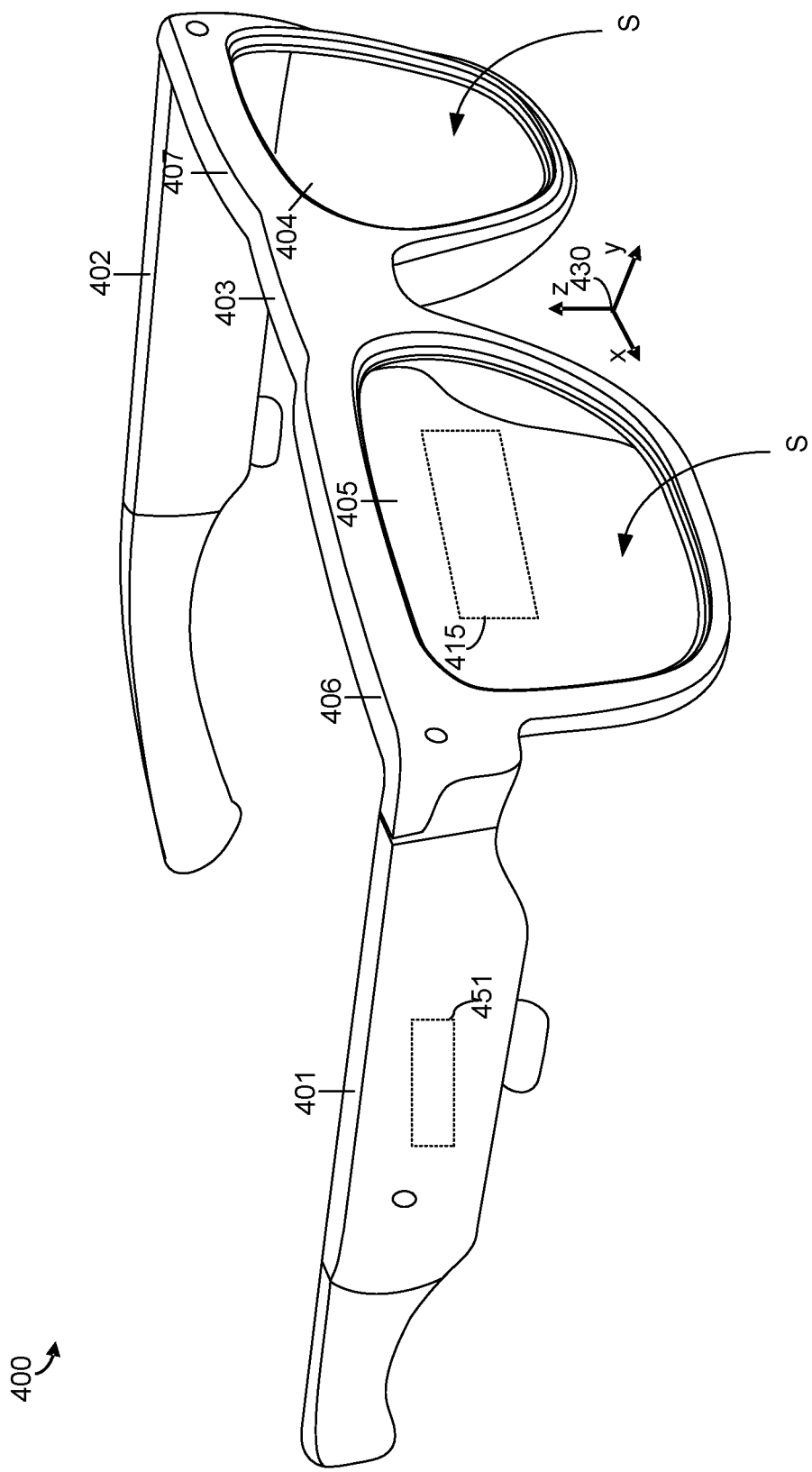
FIG. 4 is a perspective view of example smart glasses that can be used as a HMD device to implement the AR display techniques described herein.

FIG. 4 shows a perspective view of smart glasses 400 that can be used as a HMD device to implement the AR display techniques described herein. Smart glasses 400 are configured to be worn on a head and face of a user. Smart glasses 400 can include a right half-frame 406 and a left half-frame 407 that hold transparent lenses (e.g., lens 405 and lens 404, respectively). The half frames are joined by a nose bridge section 403. A right temple (e.g., temple 401) and a left temple (e.g., temple 402) are attached to right half-frame 406 and left half-frame 407 respectively. Temples 401 and 402 can rest on the ears of the user, and nose bridge section 403 can rest on the nose of the user, to hold transparent (e.g., see-through) left lens 404 and transparent right lens 405 in front a left eye and a right eye of the user, respectively. The user may view real-world scenes through the surfaces S of the transparent lenses. At least one of the transparent lenses held by the two half-frames may include a virtual display (e.g., virtual display 415) overlaid or embedded in the lens surfaces (S). Augmented reality objects (e.g., AR content, AR user interface (UI), etc.) may be displayed in virtual display 415 overlaying views of real-world scenes observed through the lens surfaces (S).

The portions of the smart glasses 400 can be collectively referred to as the frame of the smart glasses. The frame of the smart glasses can contain electronics and other components to enable function (e.g., projection or display of AR objects). For example, the frame may include a battery, a processor, a memory (e.g., non-transitory computer readable medium), networked computing devices, and electronics to support sensors (e.g., cameras, depth sensors, IMUs, optical projectors, etc.), and interface devices (e.g., speakers, display, network adapter, etc.). In example implementations, the frame may, for example, include an inertial measurement unit (e.g., IMU 451) to sense head motions of the user. The smart glasses may display and sense relative to a coordinate system 430. The coordinate system 430 can be aligned with a user's head pose when wearing the smart glasses. For example, when smart glasses 400 are worn on the user's head, the eyes of the user may be along a line in a horizontal (e.g., x-direction) direction of coordinate system 430.

A user wearing the smart glasses can experience information displayed within the lens (or lenses) so that the user can view virtual elements within their natural field of view. Accordingly, virtual display 415 in smart glasses 400 may be configured as a heads-up display (i.e., AR display, see through display) configured to display visual information at a lens (or lenses) of the smart glasses. The heads-up display (i.e., lens surfaces S including virtual display 415) may present AR objects or content (e.g., AR content, AR user interfaces, images, graphics, text, icons, etc.) on a portion (i.e., virtual display 415) of a lens (or lenses) of the smart glasses so that a user may view the AR object or content as the user sees or views real-world scenes through a lens of the AR glasses. In this way, the AR content can overlap with the user's view of the real-world scenes. The AR display portion (i.e., virtual display 415) may include all or part of a lens (or lenses) of the smart glasses.

The size and shape of the smart glasses may impact the resources available for power and processing. Accordingly, the smart glasses may communicate wirelessly with other devices (e.g., computing devices). The wireless communication may facilitate the devices to share processing (e.g., for computing responses to head motion data), which can mitigate their impact on the available resources of the smart glasses.

FIG. 5 shows an example method 500 for display of an AR object on a HMD device (e.g., smart glasses 400) worn on a viewer's head.

Method 500 includes displaying an augmented reality (AR) object at a first position and orientation on a surface of a head-mounted display (HMD) device through which a view of a real-world scene is viewed by the viewer (510). The HMD device is worn on the viewer's head. The first position and orientation on the surface correspond to a first position of the HMD device (e.g., before the viewer's head motion).

Method 500 further includes detecting a movement of the HMD device to a second position corresponding to a movement of the viewer's head) (520), and in response to the detected movement to the second position, moving the displayed AR object to an intermediate position and orientation on the surface of the HMD device (530). The intermediate position and orientation may lie between the first position and orientation and a head-locked position and orientation on the surface of the HMD device. The head-locked position and orientation can correspond to the second position of the HMD device.

FIG. 6 shows another example method 600 for display of AR content on a HMD device (e.g., smart glasses 400) worn on a viewer's head.

Method 600 includes projecting an augmented reality (AR) object (e.g., a two-dimensional (2D) AR user interface (UI)) at a first position on a surface of a head-mounted display (HMD) device through which a view of a real-world scene is viewed by a viewer (610), and detecting a motion of the HMD device corresponding to a head motion of the viewer (620). Method 600 further includes, in response to the head motion, moving the projected AR object across the surface of the HMD device to a second position, the movement of the projected AR object spatially and or temporally lagging the motion of the HMD device corresponding to the head motion of the viewer (630).

In example implementations, the response to the head motion may depend on the characteristics (e.g., frequency and amplitude) of the head motion. In some implementations there may be no response (i.e. no movement of the AR object) for high-frequency head motions. For example, high frequency small amplitude head motions may be filtered out without any responsive movements of the AR object. In some implementations there may be a limited response (i.e., small or negative movements of the AR object) for low frequency motions. For example, response to low frequency high amplitude head motions may be dampened causing only small or negative responsive movements of the AR object.

Figure 7:
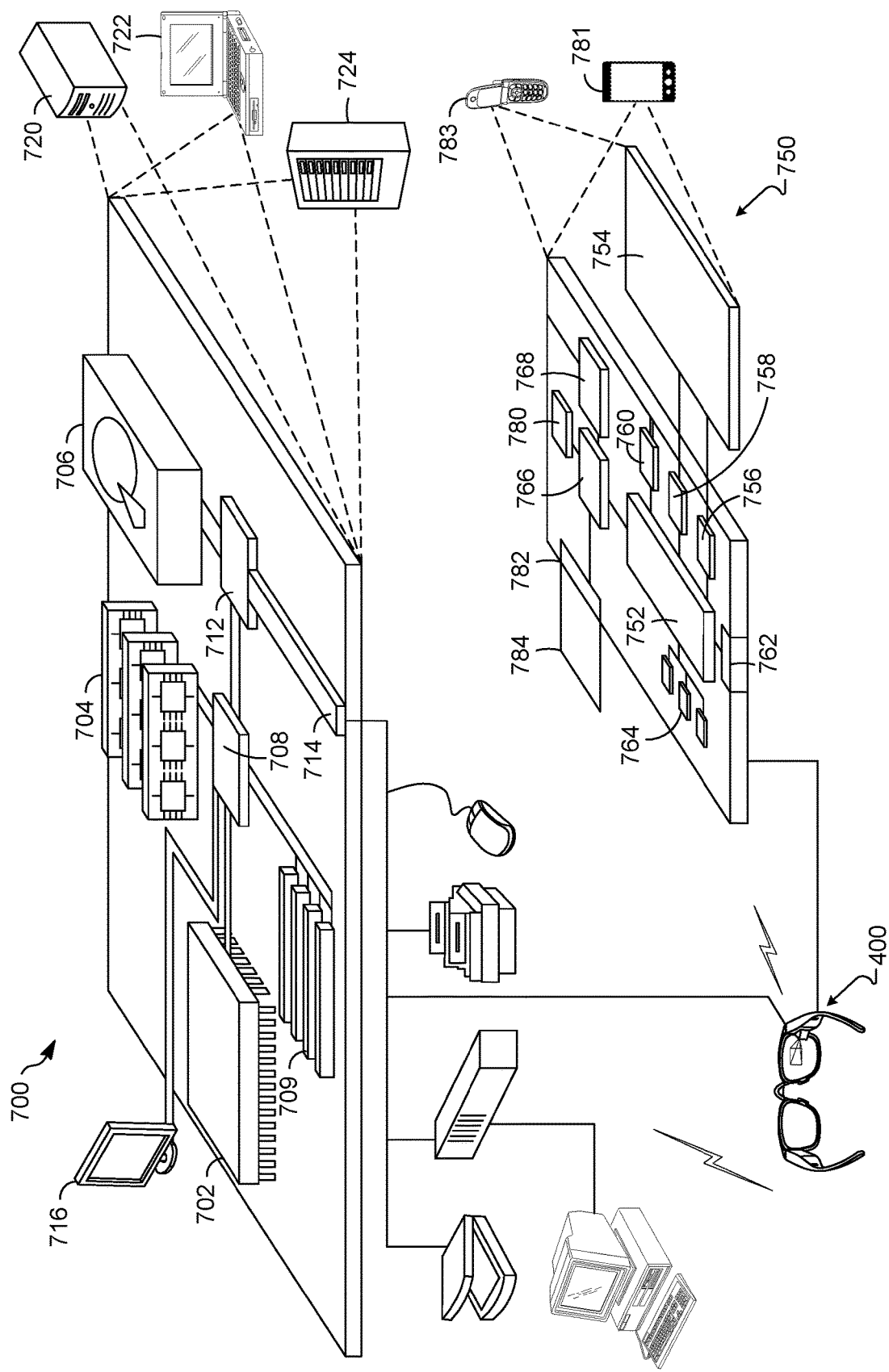
FIG. 7 illustrates an example of a computing device and a mobile computing device, which may be used with the techniques described here.

FIG. 7 shows an example of a computer device 700 and a mobile computer device 750, which may be used with system 300 (and consumer electronic devices such as smart glasses 400 that may incorporate components of system 300), and with the AR display techniques described herein. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low-speed interface 712 connecting to low-speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high-speed interface 708. In some implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In some implementations, the memory 704 is a volatile memory unit or units. In some implementations, the memory 704 is a non-volatile memory unit or units. The memory 704 may also be another form of computer-readable medium, such as a magnetic or optical disk.

The storage device 706 is capable of providing mass storage for the computing device 700. In some implementations, the storage device 706 may be or contain a computer-readable medium, such as a floppy disk device, a hard disk device, an optical disk device, or a tape device, a flash memory or other similar solid-state memory device, or an array of devices, including devices in a storage area network or other configurations. The computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high-speed controller 708 manages bandwidth-intensive operations for the computing device 700, while the low-speed controller 712 manages lower bandwidth-intensive operations. Such allocation of functions is exemplary only. In some implementations, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 752, 754, 764, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, to enable near area communication of device 750 with other devices. External interface 762 may provide, for example, for wired communication in some implementations, or for wireless communication in some implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In some implementations, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752, that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, Wi-Fi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smart phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementations in some or more computer programs that are executable and/or interpretable on a programmable system including at least one programmable processor, which may be special or general purpose, coupled to receive data and instructions from, and to transmit data and instructions to, a storage system, at least one input device, and at least one output device. Various implementations of the systems and techniques described here can be realized as and/or generally be referred to herein as a circuit, a module, a block, or a system that can combine software and hardware aspects. For example, a module may include the functions/acts/computer program instructions executing on a processor (e.g., a processor formed on a silicon substrate, a GaAs substrate, and the like) or some other programmable data processing apparatus.

Some of the above example implementations are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example implementations. Example implementations, however, be embodied in many alternate forms and should not be construed as limited to only the implementations set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example implementations. As used herein, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular implementations s only and is not intended to be limiting of example implementations. As used herein, the singular forms a, an, and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example implementations belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example implementations and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative implementations, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device or mobile electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example implementations are typically encoded on some form of non-transitory program storage medium or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The example implementations are not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or implementations herein disclosed irrespective of whether or not that particular combination has been specifically enumerated in the accompanying claims at this time.

While example implementations may include various modifications and alternative forms, implementations thereof are shown by way of example in the drawings and will herein be described in detail. It should be understood, however, that there is no intent to limit example implementations to the particular forms disclosed, but on the contrary, example implementations are to cover all modifications, equivalents, and alternatives falling within the scope of the claims. Like numbers refer to like elements throughout the description of the figures.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

As used in this specification, a singular form may, unless definitely indicating a particular case in terms of the context, include a plural form. Spatially relative terms (e.g., over, above, upper, under, beneath, below, lower, and so forth) are intended to encompass different orientations of the device in use or operation in addition to the orientation depicted in the figures. In some implementations, the relative terms above and below can, respectively, include vertically above and vertically below. In some implementations, the term adjacent can include laterally adjacent to or horizontally adjacent to.

What is claimed is:

1. A method comprising:
    displaying an augmented reality (AR) object at a first position and orientation on a surface of a head-mounted display (HMD) device through which a view of a real-world scene is viewed by a viewer, the HMD device being worn on a head of the viewer, the first position and orientation on the surface corresponding to a first position of the HMD device;
    detecting a movement of the HMD device along a first path to a second position corresponding to a movement of the head of the viewer; and
    in response to the movement of the HMD device, moving the AR object along a second path different from the first path to an intermediate position and orientation on the surface of the HMD device, the intermediate position and orientation being between the first position and orientation and a head-locked position and orientation on the surface of the HMD device, the head-locked position and orientation corresponding to the second position of the HMD device.

2. The method of claim 1, wherein detecting the movement of the HMD device includes detecting one or more linear translations of the HMD device along three perpendicular axes (x, y, and z) and angular rotations of the head of the viewer about the three perpendicular axes (x, y, and z).

3. The method of claim 2 wherein detecting the movement of the HMD device includes using an inertial measurement unit (IMU) to measure, at a frame rate of the IMU, one or more of an angular velocity, an acceleration, and a three-degrees-of-freedom (3 DoF) pose (pitch, yaw, roll) of the HMD device.

4. The method of claim 3, wherein moving the AR object to the intermediate position and orientation on the surface of the HMD device includes restricting responsive movement of the AR object during the movement of the head of the viewer to lie within a pre-defined geometrical range of positions on the surface of HMD device.

5. The method of claim 4, wherein restricting responsive movement of the AR object to lie within a pre-defined geometrical range of positions on the surface of the HMD device includes using the angular velocity to compensate for pitch and yaw and applying:
- a dampening setting to the movement of the AR object to scale down the angular velocity used to compensate for pitch and yaw;
- a stiffness setting to the movement of the AR object to control return or bouncing behavior of the AR object at edges of the pre-defined geometrical range of positions corresponding to a limit of a pitch and yaw range; and
- a center bias setting to the movement of the AR object to pull the AR object back to a center of the pre-defined geometrical range of positions on the surface of HMD device.

6. The method of claim 3, wherein moving the AR object to the intermediate position and orientation on the surface of the HMD device includes using the angular velocity to compensate for yaw and or pitch of the HMD device, and using the 3 DoF pose to compensate for roll of the HMD device.

7. The method of claim 6, wherein using the angular velocity to compensate for yaw and or pitch of the HMD device includes:
- integrating the angular velocity into a delta rotation;
- using the delta rotation to rotate a forward vector, projecting the forward vector from three dimensions (3D) to two dimensions (2D); and
- using a negative of the forward vector to shift the AR object on the surface of the HMD device.

8. The method of claim 6, wherein using the 3 DoF pose to compensate for roll of the HMD device includes:
- determining an angle corresponding to roll of the HMD device;
- compensating for roll of the HMD device by applying a negative of the angle corresponding to the roll of the HMD device to rotate the AR object on the surface of the HMD device in an opposite direction to the roll of the HMD device; and
- to avoid gimbal lock, reducing the compensating for roll of the HMD device when pitch approaches ±90°.

9. A method comprising:
- projecting an augmented reality (AR) object at a first position on a surface of a head-mounted display (HMD) device through which a view of a real-world scene is viewed by a viewer;
- detecting a motion of the HMD device along a first path corresponding to a head motion of the viewer; and
- in response to the motion of the HMD device, moving the AR object across the surface of the HMD device along a second path different from the first path to a second position,
- the AR object having movement lagging the motion of the HMD device corresponding to the head motion of the viewer.

10. The method of claim 9, wherein detecting the motion of the HMD device includes using an inertial measurement unit (IMU) to measure, at a frame rate of the IMU, one or more parameters characterizing the motion of the HMD device, the one or more parameters including an angular velocity, an acceleration, and a three-degrees-of-freedom (3 DoF) pose (pitch, yaw, roll) of the head motion of the viewer.

11. The method of claim 10, wherein moving the AR object to the second position on the surface of the HMD device in response to the motion of the HMD device includes a 2D translational shift through a translation distance and or an-in-plane rotation through a rotation angle to the second position on the surface of the HMD device, the translation distance and the rotation angle being based on the one or more parameters characterizing the motion of the HMD device.

12. The method of claim 11, wherein moving the AR object across the surface of the HMD device to the second position in response to the motion of the HMD device includes restraining the movement of the AR object to remain within a pre-defined area of the surface of the HMD device corresponding to an allowed pitch and yaw range for the movement of the AR object across the surface of the HMD device.

13. The method of claim 12, wherein moving the AR object across the surface of the HMD device to the second position includes biasing the movement to return the AR object to a center of the pre-defined area.

14. The method of claim 12, wherein moving the AR object across the surface of the HMD device to the second position includes bouncing back the AR object from an edge of the pre-defined area toward a center of the pre-defined area.

15. The method of claim 12, wherein moving the AR object across the surface of the HMD device to the second position includes rotating the AR object in an opposite direction to a roll angle of the HMD device to the AR object aligned with gravity.

16. A system comprising:
- a computing device configured to project an augmented reality (AR) object at a first position and orientation on a surface of a head-mounted display (HMD) device worn on a head of a viewer; and
- at least one sensor configured to detect a motion of the HMD device along a first path corresponding to a head motion of the viewer,
- the computing device further configured to, in response to the motion of the HMD device along the first path, move the AR object across the surface of the HMD device along a second path different from the first path to a second position,
- the AR object having movement along the second path spatially and temporally lagging the motion of the HMD device along the first path.

17. The system of claim 16, wherein the at least one sensor is an inertial measurement unit (IMU) attached to, or included in, the HMD device worn by the viewer, the IMU configured to measure an angular velocity, an acceleration, and a three-degrees-of-freedom (3 DoF) pose (pitch, yaw, roll) of the HMD device.

18. The system of claim 17 further comprising a sensor fusion module, the sensor fusion module including algorithms to combine data on the acceleration and angular velocity received from the IMU to determine pose of the HMD device.

19. The system of claim 18 further comprising an image stabilization module, the image stabilization module configured to, given the pose of the HMD device, compute roll, pitch and yaw corrections required for modifying the image of the AR object or content for a stabilized display on the HMD device.

20. The system of claim 19 further comprising an image renderer module, the image renderer module configured to render the image of the AR object or content as a stabilized image display of the AR object or content in the HMD device while the head of the viewer is moving.

* * * * *

UNITED STATES PATENT AND TRADEMARK OFFICE
CERTIFICATE OF CORRECTION

| | | |
|---|---|---|
| PATENT NO. | : 11,681,358 B1 | |
| APPLICATION NO. | : 17/643711 | |
| DATED | : June 20, 2023 | |
| INVENTOR(S) | : Rahman et al. | |

It is certified that error appears in the above-identified patent and that said Letters Patent is hereby corrected as shown below:

In the Claims

In Column 20, Claim 18, Line 52, after "and" insert -- the --.

Signed and Sealed this
Twenty-ninth Day of October, 2024

Katherine Kelly Vidal
*Director of the United States Patent and Trademark Office*